United States Patent [19]
Smorodinsky

[11] Patent Number: 6,049,786
[45] Date of Patent: Apr. 11, 2000

[54] ELECTRONIC BILL PRESENTMENT AND PAYMENT SYSTEM WHICH DETERS CHEATING BY EMPLOYING HASHES AND DIGITAL SIGNATURES

[75] Inventor: Lev Smorodinsky, Laguna Hills, Calif.

[73] Assignee: Unisys Corporation, Blue Bell, Pa.

[21] Appl. No.: 08/898,563

[22] Filed: Jul. 22, 1997

[51] Int. Cl.[7] .................................................. G06F 17/60
[52] U.S. Cl. .................................. 705/40; 705/34; 380/24
[58] Field of Search .............................. 705/26, 27, 35, 705/40, 44, 34; 380/24, 25, 29, 30

[56] References Cited

U.S. PATENT DOCUMENTS

| 5,283,829 | 2/1994 | Anderson | 380/24 |
|---|---|---|---|
| 5,465,206 | 11/1995 | Hill et al. | 705/14 |
| 5,677,955 | 10/1997 | Doggett et al. | 380/24 |
| 5,699,528 | 12/1997 | Hogan | 705/40 |
| 5,761,306 | 6/1998 | Lewis | 380/21 |

*Primary Examiner*—Allen R. MacDonald
*Assistant Examiner*—Hani M. Kazimi
*Attorney, Agent, or Firm*—Charles J. Fassbender; Mark T. Starr; Steven B. Samuels

[57] ABSTRACT

An electronic bill presentment and payment system includes multiple biller computers, a bill presentment computer, and multiple customer computers. Each biller computer stores complete bills for the customer of a corresponding biller, and the bill presentment computer stores a respective summary of each complete bill along with a hash of that complete bill which is digitally signed by the biller computer. Each particular customer computer makes a payment on a selected complete bill by generating a payment message which includes a) the hash of the selected complete bill digitally signed by the biller computer, and b) an authorization to pay a specified amount of funds on the selected complete bill, both of which are digitally signed by that particular customer computer. This payment message is stored in a closing record for use in resolving issues regarding whether or not the bill was changed after payment was authorized, and whether or not an alleged payment on the selected bill was authorized.

15 Claims, 9 Drawing Sheets

Fig. 2A

※ California Bell 🔔 ※

| Residence Flat Rate Serv | | Statement Date | JOHN DOE | Page 1 |
|---|---|---|---|---|
| Account Number | | May 21, 1997 | 1234 MAIN ST | |
| 808 677-1234 | 227 K 0193 | | IRVINE, CA 92356 | |
| Current | California Bell | | Page 1-7 | 545.21 |
| Charges | NCI | | Page 8-10 | 516.68 |
| Total Due | Due by Jun 11, 1997 | | | $1061.89 |

LATE CHARGE REMINDER. A late charge may apply on June 13 if your payment has not been received. (See Reverse)

Work At Home?  Do you need help setting up your home office? Do you telecommute and want to make better use of your phone service? Call Work at Home Resources at 1-800-700-1100 for a free consultation.

California Bell Calls From 808 677-1234

| | Date | Time | Place and Number Called | | Type | Rate | Minutes | Amount Before Discount |
|---|---|---|---|---|---|---|---|---|
| 1. | Apr21 | 3:04pm | LOSANGELESCA | 213 874-6611 | Direct | Day | 1 | .15 |
| 2. | Apr21 | 10:47pm | BEVERLYHLS CA | 310 648-9843 | Direct | Eve | 2 | .22 |
| 3. | Apr22 | 11:22am | AGOURA     CA | 818 573-9984 | Direct | Day | 9 | 2.06 |
| 4. | Apr22 | 3:13pm | LOSANGELESCA | 213 874-6611 | Direct | Day | 7 | .29 |
| 5. | Apr23 | 10:31pm | BEVERLYHLS CA | 310 648-9843 | Direct | Eve | 2 | .22 |
| 6. | Apr23 | 11:49am | AGOURA     CA | 818 573-9984 | Direct | Day | 8 | 1.89 |
| 7. | Apr24 | 12:49am | AGOURA     CA | 818 573-9984 | Direct | Day | 9 | 2.06 |
| | | | ⋮ | | | | | |
| 255. | May 20 | 9:20pm | LOSANGELESCA | 213 778-2249 | Direct | Eve | 7 | .72 |
| 256. | May 20 | 9:30pm | LOSANGELESCA | 213 426-1737 | Direct | Eve | 17 | 1.76 |
| 257. | May 20 | 9:55pm | RESEDA    CA | 818 07-5040 | Direct | Eve | 21 | 2.65 |

Total California Bell Calls from 808 677-1234     $531.97

Taxes & Surcharges

| | Description | Amount |
|---|---|---|
| 1. | Charges for Network Access for Interstate Calling, Imposed by Federal Communications Commission | 7.00 |
| 2. | CA High Cost Fund Surcharge - A: | 2.21 |
| 3. | California Teleconnect Fund Surcharge | .31 |
| 4. | Universal Lifeline Telephone Service Surcharge | 2.47 |
| 5. | Rate Surcharge | 2.37CR |
| 6. | State Regulatory Fee | .08 |
| 7. | CA Relay Service and Communications Devices Fund | .28 |
| 8. | Tax: Fed: 2.65   911: .59   Local: | 3.24 |

Total Taxes and Surcharges     $13.24

Fig. 2B

Account Number  
808 677-1234  235 S 0182  
NCI Account Number  
7Q633529

Statement Date  
May 21, 1997  
Questions about your NCI bill?  
800-266-9963

Page 8

✶NCI✶✶ 

———————— 15c ————————

Long Distance

Calls from 808 677-1234:

| | Date | Time | Place and Number Called | | Type | Rate+ | Minutes | Amount |
|---|---|---|---|---|---|---|---|---|
| 1. | Apr 21 | 7:25pm | SAN JOSE CA | 408 244-1977 | Direct | Eve | 1 | .09 |
| 2. | Apr 21 | 7:38pm | FAIR LAWN NJ | 201 705-3304 | Direct | Eve | 1 | .14 |
| | | | • | | | | | |
| 83. | May 20 | 4:30pm | RIDLEYPARKPA | 610 592-1293 | Direct | Day | 8 | 1.97 |

Total Calls from 808 677-1234 ............................................. 202.20  
Total Long Distance ......................................................... 202.20

International Long Distance

NCI Savings™ plan from 808 677-1234:

| | Date | Time | Place and Number Called | | Type | Rate+ | Minutes | Amount |
|---|---|---|---|---|---|---|---|---|
| 1. | Apr 21 | 9:34am | RUSSIA | 70957832217 | Direct | Std | 4 | 4.77 |
| 2. | Apr 21 | 9:40pm | Ukraine | 70957832217 | Direct | Eve | 2 | 2.38 |
| | | | • | | | | | |
| 55. | May 21 | 9:44pm | RUSSIA | 70956166486 | Direct | Eve | 3 | 3.57 |

Total NCI Savings™ plan from 808 677-1234 ......................... 310.72  
Total International Long Distance. ...................................... 310.72

Taxes and Surcharges

| | |
|---|---|
| Federal Excise Tax | .49 |
| State and Local Taxes | .02 |
| State & Local Surcharges | .04 |
| Universal Lifeline Telephone Services | .10 |
| California Relay Service and Communications Devices Fund | .01 |
| California High Cost Fund-B Surcharge | .09 |
| California Teleconnect Fund | .01 |
| Total Current Taxes and Surcharges | .76 |

Service Summary

| | |
|---|---|
| NCI Savings™ plan (03/28/97 to 10/27/97) | 3.00 |
| Long Distance | 202.20 |
| Inernational Long Distance | 310.72 |
| Total Current Charges | 515.92 |

| Service/ Biller | Account Number | Bill Reference Number (ID) | Current Charges, $ | Payment Due By, mm/dd/ yyyy | Billing Period From, mm/dd/ yyyy | Billing Period To, mm/dd/ yyyy | Past Due Amount, $ | Comments |
|---|---|---|---|---|---|---|---|---|
| California Bell | 808- 677- 1234 227 K 0193 | may211997 | 1061.89 | 06/11/ 1997 | 04/21/ 1997 | 05/20/ 1997 | 0 | |

*Display Complete Bill*  *Display Payment Screen*  *Return to LCUB*  *End*

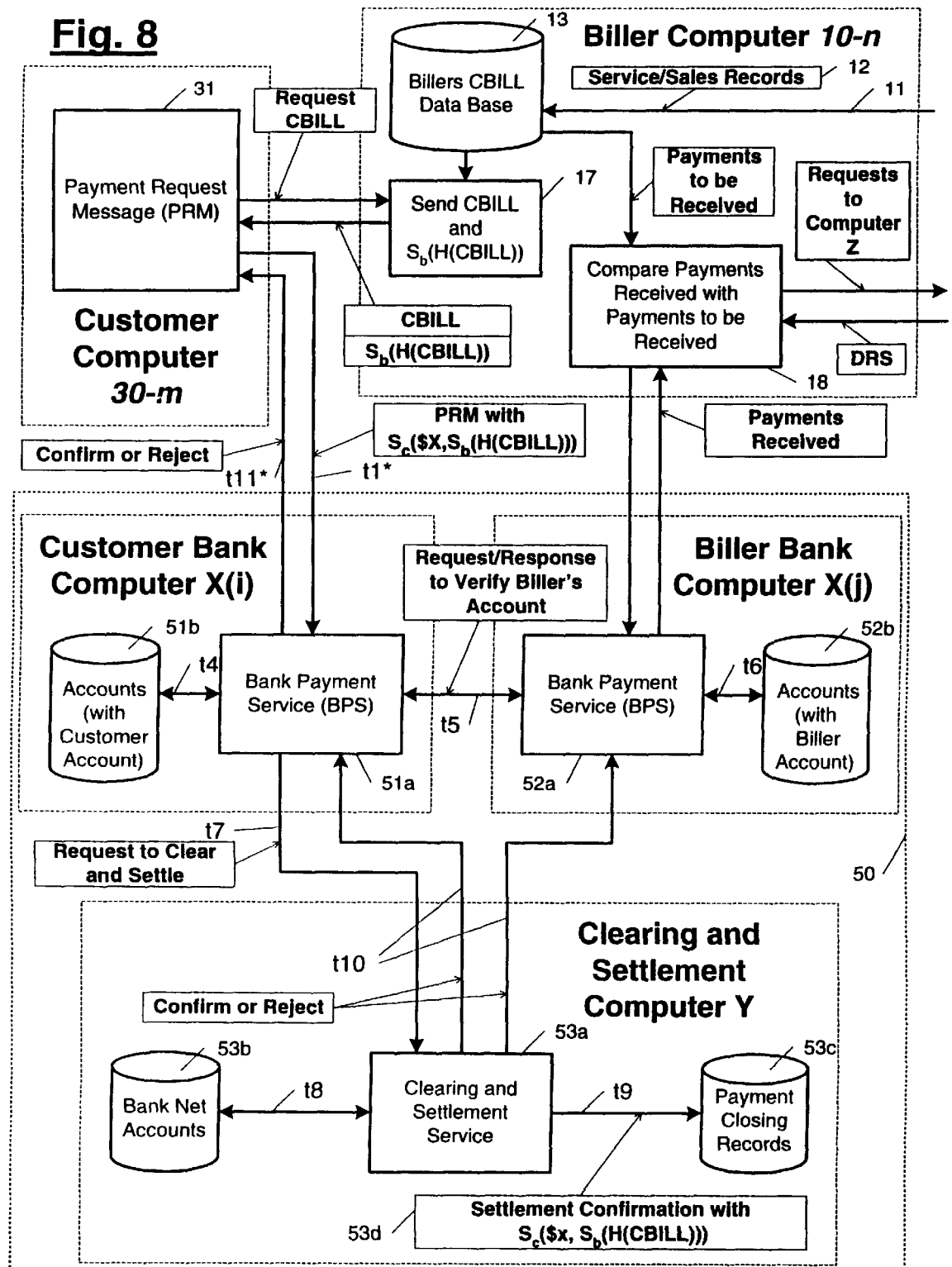

6,049,786

ELECTRONIC BILL PRESENTMENT AND PAYMENT SYSTEM WHICH DETERS CHEATING BY EMPLOYING HASHES AND DIGITAL SIGNATURES

BACKGROUND OF THE INVENTION

This invention relates to electronic systems by which bills are presented and paid.

One prior art bill presentment and payment system is disclosed in FIG. 1 of U.S. Pat. No. 5,465,206 (hereinafter the Visa patent). In this system, a customer receives a bill from a biller; and in response, the customer mails a check back to the biller. This check is then presented by the biller to the biller's bank for payment. Then the biller's bank sends the check to a settlement bank which clears and settles the transfer of funds between the biller's bank and the customer's bank. Following this settlement step, funds are transferred by the biller's bank to the biller's account where it is available for withdrawal.

In a second prior art bill presentment and payment system (which is disclosed in FIGS. 2A & 2B of the Visa patent), a customer responds to a bill from a biller by electronically sending a message to a service bureau, and this electronic message authorizes the service bureau to pay the bill. Upon receipt of the message, the service bureau writes a check on the customer's account in the customer's bank and presents that check to the service bureau's bank for payment. Then, the service bureau's bank sends the check to a settlement bank which clears and settles the transfer of funds between the service bureau's bank and the customer's bank. This sequence of steps is repeated many times for many customers of the biller. Thereafter, the service bureau sends the biller a list of all of the bills that were paid along with a single check for the total amount paid.

In a third prior art bill presentment and payment system (which is disclosed in FIG. 3 of the Visa patent), a biller obtains regular periodic payments from a customer's account in a customer's bank with those payments being initiated by the biller, rather than the customer. With this method, the biller maintains a file which identifies the customer, the amount of the periodic payment, and the date on which each payment is due. To initiate each payment, the biller electronically sends a request for payment to the biller's bank; and in response, the biller's bank generates a debit request in a certain standard format, which is required by an automated clearing house (ACH). This debit request is then stored in the biller's bank, along with all other ACH debit and credit requests which the biller's bank generates for other customers. Thereafter, a batch of ACH debit and credit requests are electronically transmitted to the Federal Reserve or other ACH clearing institution; and by this transmission, net accounts between the biller's bank and the customer's bank are settled.

In a fourth prior art bill presentment and payment system (which is disclosed in FIGS. 4–12 of the Visa patent), the biller's bank, the customer's bank, and a settlement bank are all intercoupled by an electronic payment network. With this method, a customer responds to a bill from a biller by ordering the customer's bank to pay the bill. In response, the customer's bank examines the customer's account to determine if sufficient funds are available to pay the bill or determine that the customer's bank is willing to take the risk of loss if funds are not available. If either determination is made, the customer's bank electronically sends a payment message through the payment network to the biller's bank. Each such payment message is also stored in the payment network where it is acted upon by a settlement subsystem which nets the funds that are being transferred by all payment messages between the customer's bank and the biller's bank. Thereafter, the settlement subsystem electronically sends a transfer order to the settlement bank which settles the net accounts between the customer's bank and the biller's bank. By this settlement step, funds are transferred by the biller's bank to the biller's account.

However, a major drawback in all of these prior art systems is that no means is provided for electronically presenting the bill to the customer before it is paid. In the systems of FIGS. 1, 2, and 4, the bill is physically sent to the customer by conventional post office mail; and in the system of FIG. 3, the bill is paid without ever being sent to the customer.

Further, if the above prior art systems were somehow modified such that the bill was sent electronically rather than by mail, then a new problem would arise because the customer would not have any documentation from the biller to establish the amount of the bill. Consequently, after a payment is made by the customer, a biller could increase the amount due in the bill and claim that the increased amount was in the original bill.

Also, if the above prior art systems were somehow modified such that checks are eliminated and all payments occur electronically, then another new problem arises in that no canceled checks are generated to establish the amount of payment which was authorized. Consequently, after payment of a certain amount of funds is made electronically, a customer can subsequently claim that only a smaller payment was authorized and/or a biller can subsequently claim that a larger payment was authorized.

Accordingly, a primary object of the present invention is to provide an all electronic bill presentment and payment system which employs hashes and digital signatures to avoid cheating by a biller and/or customer.

BRIEF SUMMARY OF THE INVENTION

An all electronic bill presentment and payment system, which constitutes one preferred embodiment of the present invention, includes a biller computer having a data base which stores a plurality of complete bills for a plurality of customers, and a bill presentment computer, coupled to the biller computer, having a data base which stores a summary of each complete bill and a respective hash of each complete bill which is digitally signed by the biller computer. Also, this embodiment includes multiple customer computers, coupled to the biller computer and the bill presentment computer; and each particular customer computer—a) can request and receive from the bill presentment computer, a summary of a selected complete bill plus its respective digitally signed hash, and b) can request and receive from the biller computer, the selected complete bill.

To ensure that the selected complete bill in the biller computer was not changed after the summary of that complete bill was stored in the bill presentment computer, the particular customer computer generates a new hash of the selected complete bill as received from the biller computer, and decrypts the digitally signed hash of the selected complete bill as received from the bill presentment computer. If the new hash does not equal the decrypted hash, the customer computer displays a message indicating that the bill should not be paid because the discrepancy exists.

If the new hash and the decrypted hash are equal, then a payment message can be sent from the particular customer computer to the bill presentment computer; and this payment message includes—a) the digitally signed hash of the selected complete bill, and b) an authorization to pay a specified amount of funds on the selected complete bill, both of which are digitally signed by the particular customer computer. Preferably this payment message is stored in the database of the bill presentment computer and in a closing record of an electronic payment subsystem which couples to the bill present computer.

Thereafter, the stored payment message can be used to resolve certain disputes which may arise between the biller and the customer. If the issue in the dispute is whether or not the bill was changed after payment was authorized, then this is resolved by a dispute resolving means which: reads from the closing record, the hash of the selected complete bill which is digitally signed by the biller computer and the particular customer computer; decrypts the digitally signed hash to thereby obtain the hash in an unsigned form; generates a new hash of the complete bill as currently stored in the biller computer; and, compares the new hash to the decrypted hash in unsigned form. A miscompare indicates that the complete bill was changed after payment was authorized.

If the issue in the dispute is whether or not an alleged payment was made on the selected bill, then this is resolved by the dispute resolving means which: reads from the closing record, the authorization to pay the specified amount of funds which is digitally signed by the particular customer computer; decrypts the digitally signed authorization to thereby obtain the specified amount of funds in an unsigned form; and, compares the unsigned specified amount of funds to the alleged payment. If a miscompare occurs, the alleged payment was not authorized and thus did not occur.

Preferably, each digitally signed hash consists of sixteen to thirty-two bytes; whereas each complete bill typically consists of thousands of bytes. Consequently, by storing the hash of the complete bill rather than the entire complete bill, the total amount of storage is greatly reduced in the data base of the bill presentment computer and in the closing records of the payment subsystem.

BRIEF DESCRIPTION OF THE DRAWINGS

FIGS. 2A & 2B together show an example of a complete bill, and such a complete bill is indicated in FIG. 1 as CBILL.

FIG. 8 shows two additional modifications to the bill presentment and payment system of FIGS. 1–6.

DETAILED DESCRIPTION

Figure 1:
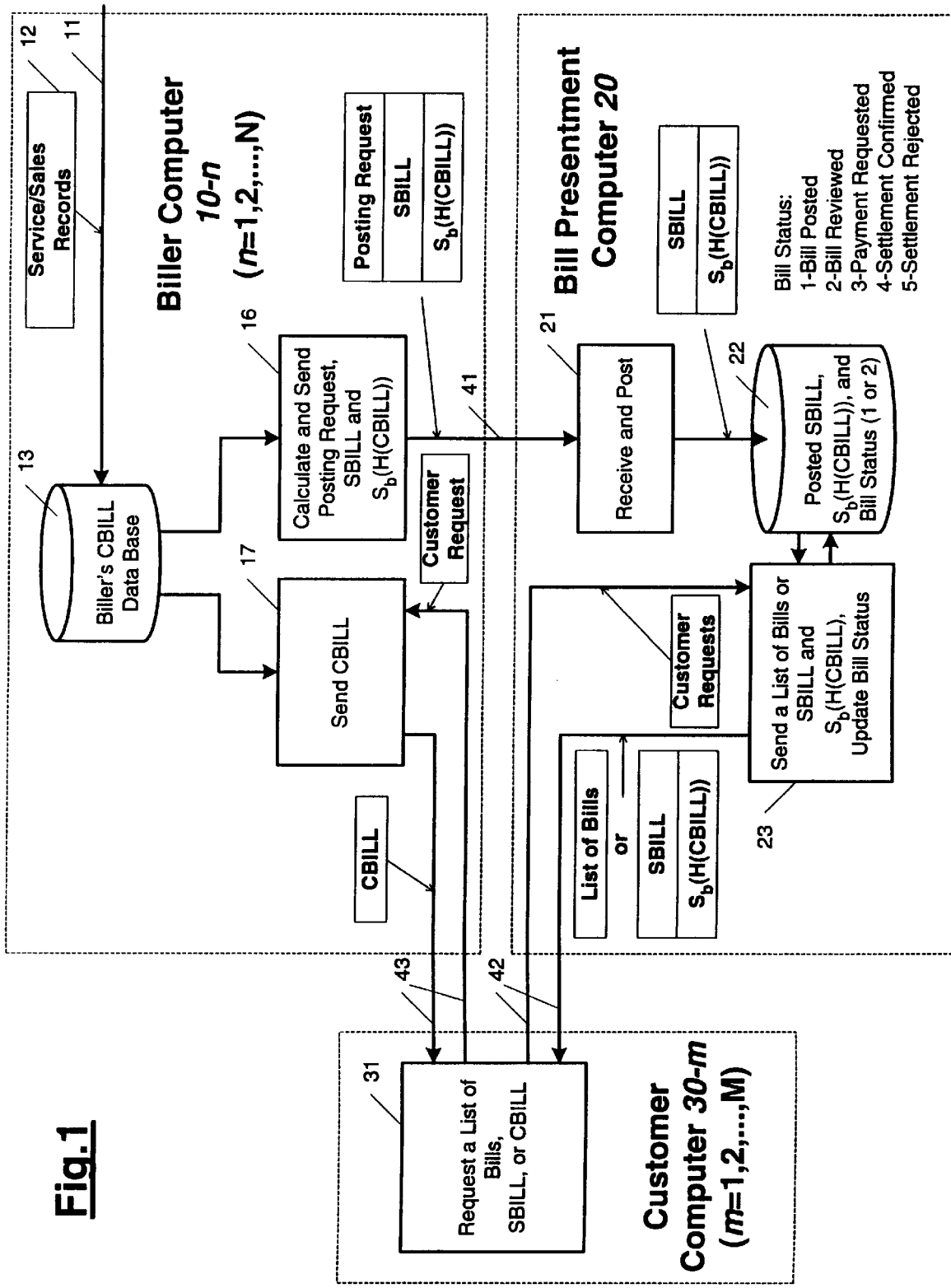
FIG. 1 shows an electronic bill presentment and payment system which constitutes one preferred embodiment of the present invention.

In FIG. 1, an electronic bill processing system is shown which constitutes one preferred embodiment of the present invention. This FIG. 1 embodiment includes multiple biller computers 10-$n$ (where n equals 1,2, . . . N), a single bill presentment computer 20, and multiple customer computers 30-$m$ (where m equals 1,2, . . . M). All of these computers 10-$n$, 20, and 30-$m$ are intercoupled by communication channels 41, 42 and 43 as shown.

Each biller computer 10-$n$ has an input 11 on which it receives detailed sales and service data 12 for various customers; and this data 12 is stored in a database 13 within the biller computer 10-$n$. There, the data 12 is arranged as one or more complete bills for each customer. A particular complete bill is indicated in FIG. 1 as CBILL, and an example of one typical CBILL is shown in FIGS. 2A & 2B.

Inspection of the CBILL in FIGS. 2A & 2B shows that it includes several lists 14$a$–14$e$ of the individual items for which there is a charge. To save space in FIGS. 2A & 2B, many of the individually billed items are replaced with a series of three dots; but in an actual CBILL, all of the individually billed items are shown. Also, the CBILL in FIGS. 2A & 2B contains superfluous information such as an advertisement 15$a$, company logos 15$b$ and 15$c$, a reminder 15$d$ of a penalty which is incurred if the total amount due is not paid by a certain date, etc.

Figure 3:
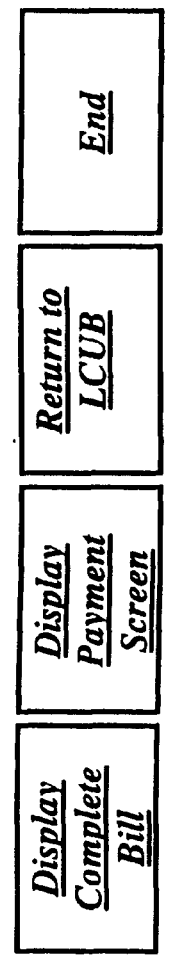
FIG. 3 shows an example of a summary of the complete bill of FIGS. 2A & 2B, and such a summary is indicated in FIG. 1 as SBILL.

Each biller computer 10-$n$ also includes a program 16 which operates on each CBILL in its database 13, as follows. First, the program 16 generates a summary of the complete bill, and this summary is indicated in FIG. 1 as SBILL. FIG. 3 shows an example of an SBILL for the CBILL in FIGS. 2A & 2B. By extracting the superfluous information 15$a$–15$d$ and replacing the lists 14$a$–14$e$ with one total amount due, the SBILL of FIG. 3 is made at least twenty times shorter than the CBILL of FIGS. 2A & 2B.

After the bill summary is generated, the program 16 generates a hash of the complete bill; and then the program 16 uses a biller computer private key to digitally sign the hash. This hash prior to signing is indicated in FIG. 1 as H(CBILL); the digitally signed hash is indicated in FIG. 1 as $S_b$ (H(CBILL)); and $S_b$ indicates the signing occurred with the private key "b" in the biller computer. Then, the program 16 sends a posting request to the bill presentment computer 20 which contains the bill summary SBILL and the digitally signed hash $S_b$(H(CBILL).

In the bill presentment computer 20, a program 21 is included which receives the bill summary SBILL and the digitally signed hash $S_b$(H(CBILL)). This program 21 then posts the bill summary SBILL and the digitally signed hash $S_b$ (H(CBILL)) by storing them in a database 22 within the bill presentment computer. Also, the program 21 stores a bill status code of "1" in the database 22 which indicates that the bill summary SBILL and the digitally signed hash $S_b$(H (CBILL)) are now posted.

Figure 4:
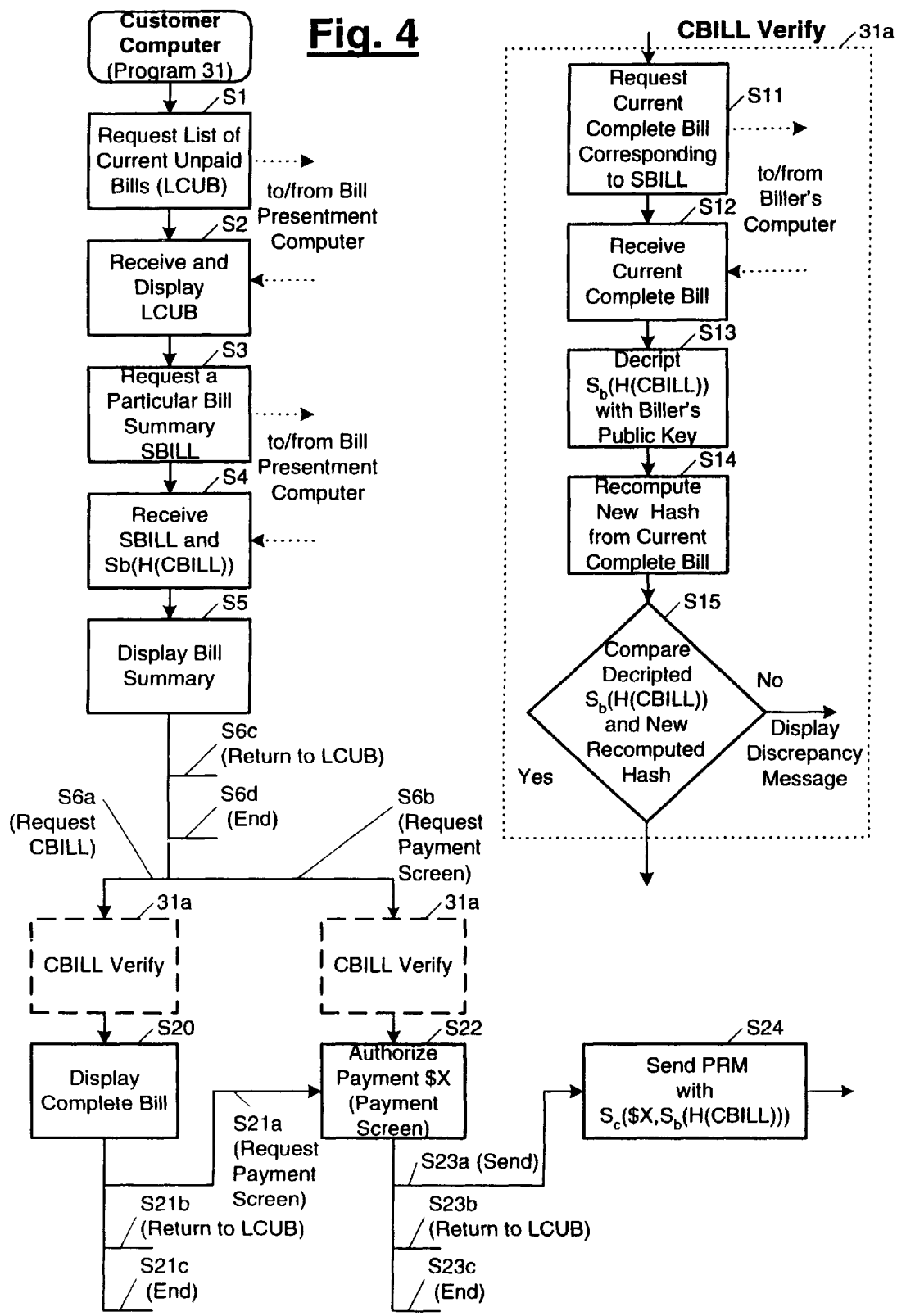
FIG. 4 shows various steps which are performed by a program 31 in the customer computer 30-$m$ of FIG. 1.

Each customer computer 30-$m$ includes a program 31, the details of which are shown in FIG. 4, that interacts with the bill presentment computer 20 and the biller computers 10-$n$. To begin, the program 31 receives a request from an operator of the customer computer 30-$m$ to display a list of current unpaid bills (LCUB). In response, the customer computer performs step S1 of FIG. 4 in which the request is sent to the bill presentment computer 20. This request is received in the bill presentment computer by a program 23 which examines the database 22 and generates the requested list. Then, the requested list of current unpaid bills is sent to the customer computer 30-$m$ where it is received and displayed by program 31, as indicated by step S2 in FIG. 4.

Thereafter, the operator of the customer computer 30-$m$ can make a request to see a particular bill summary SBILL which is on the list. In response, the program 31 sends a request to the bill presentment computer for that particular bill summary as indicated by step S3 in FIG. 4. Then, program 23 in the bill presentment computer 20 obtains the requested bill summary, from the database 22, as well as the digitally signed hash of the corresponding complete bill. That summary and signed hash are then sent to the customer computer, where they are received as step S4 in FIG. 4. Also, the bill presentment computer changes the status code of the bill summary which it sent to "2", to thereby indicate that the bill has been reviewed by the customer computer.

Next, in step S5 of FIG. 4, program 31 in the customer computer 30-$m$ displays the bill summary which it receives. Then, based on what that bill summary shows, the operator of the customer computer 30-$m$ has several options S6$a$–S6$d$ on how to proceed. With option S6$a$, a request is made to display the complete bill which corresponds to the bill summary that is being displayed. With option S6$b$, a request is made for a payment subscreen whereby a selectable amount of funds can be paid on the bill whose summary is being displayed. With option S6$c$, step S1 can be returned to, whereupon the list of current unpaid bills will again be displayed. With option S6$d$, the interaction with the bill presentment computer 20 and biller computers 10-$m$ can be terminated. These options are shown under the bill summary of FIG. 3; and a particular option is selected by moving a cursor via a mouse on the desired option and "clicking".

If option S6$a$ is selected, the customer computer 30-$m$ performs a subroutine 31$a$ within the program 31 which includes steps S11–S15. In step S11, the customer computer 30-$m$ sends a request to the biller computer 10-$n$ for the particular complete bill which corresponds to the bill summary that is being displayed. Each biller computer includes a program 17, which responds to such the request by retrieving a complete bill from its database 13 which should be the requested complete bill, and by sending the complete bill which was retrieved to the customer computer 30-$m$. This complete bill is received by subroutine 31$a$ in the customer computer as step S12 in FIGS. 2A & 2B.

Next, in step S13, the subroutine 31$a$ uses a public key for the biller's computer to decrypt the digitally signed hash $S_b(H(CBILL))$. By this step, the hash of the complete bill is obtained in unencrypted form as $H(CBILL)$. Then in step S14, the subroutine 31$a$ recomputes a new hash on the complete bill which it obtained in step S12 from the biller's computer 10-$n$. Then in step S15, the subroutine 31$a$ compares the decrypted hash of step S13 with the new recomputed hash of step S14.

If the two compared hashes are not equal, then a message is displayed which alerts the operator to the discrepancy. One potential cause for this discrepancy is that the complete bill in the biller's computer 10-$n$ was changed after the summary of the complete bill CBILL and its digitally signed hash were posted in the bill presentment computer 20. Thus, by displaying the discrepancy message, the customer is protected against making a payment on a bill where the current complete bill as retrieved from the biller computer and its summary as posted in the bill presentment computer, do not agree.

Conversely, if the two compared hashes in step S15 are equal, then the requested complete bill is displayed on the customer computer 30-$m$. This occurs as step S20 in FIG. 4. Then, based on what the displayed complete bill shows, the operator of the customer computer 30-$m$ has several options S21$a$–S21$c$ on how to proceed.

With option S21$a$, a request is made for a payment subscreen whereby a selectable amount of funds can be paid on the complete bill which is being displayed. With option S21$b$, the initial step S1 can be returned to whereupon the list of current unpaid bills will again be displayed. With option S21$c$, the interaction with the bill presentment computer 20 and biller computers 10-$m$ can be terminated.

If option S21$a$ is selected, then the customer computer 30-$m$ performs step S22 wherein the operator of the customer computer 30-$m$ enters an amount \$X which is to be paid on the bill. Then by option S23, the operator can authorize such payment to be made. In reponse to that authorization, the customer computer performs step S24 wherein a payment request message (PRM) is sent to the bill presentment computer 20. This payment request message contains—a) the hash of the selected complete bill which was digitally signed by the biller computer, and b) an authorization to pay the specified amount of funds \$X on the selected complete bill. Also, the program 31 uses a customer computer private key to digitally sign both of these items a) and b) and this is indicated in step S22 of FIG. 4 as $S_c[\$X, S_b(H(CBILL))]$. Here, $S_c$ indicates the signing occurred with the private key "C" in the customer computer.

Due to the fact that the payment amount \$X is signed by the customer computer as $S_c$ in step S24, the biller is protected from a subsequent allegation by the customer that he paid a larger amount. Also, due to the fact that the hash of the complete bill is signed by the customer computer in step S24, the biller is protected from a subsequent allegation by the customer that the amount of his bill has been changed.

Suppose now that in FIG. 4, the operator of the customer computer selects option S6$b$ whereby a request is made for a payment subscreen on the bill summary, without seeing the complete bill. When option S6$b$ is selected, the FIG. 4 program automatically performs the above described subroutine 31$a$. Then if a payment is authorized, the FIG. 4 program performs step S24. By performing subroutine 31$a$, the customer is again protected against making a payment on a bill where the complete bill and its summary do not agree. By performing step S24, the biller is again protected against the customer disputing the amount which he authorized to be paid and/or disputing the amount due in the bill which he received.

Figure 5:
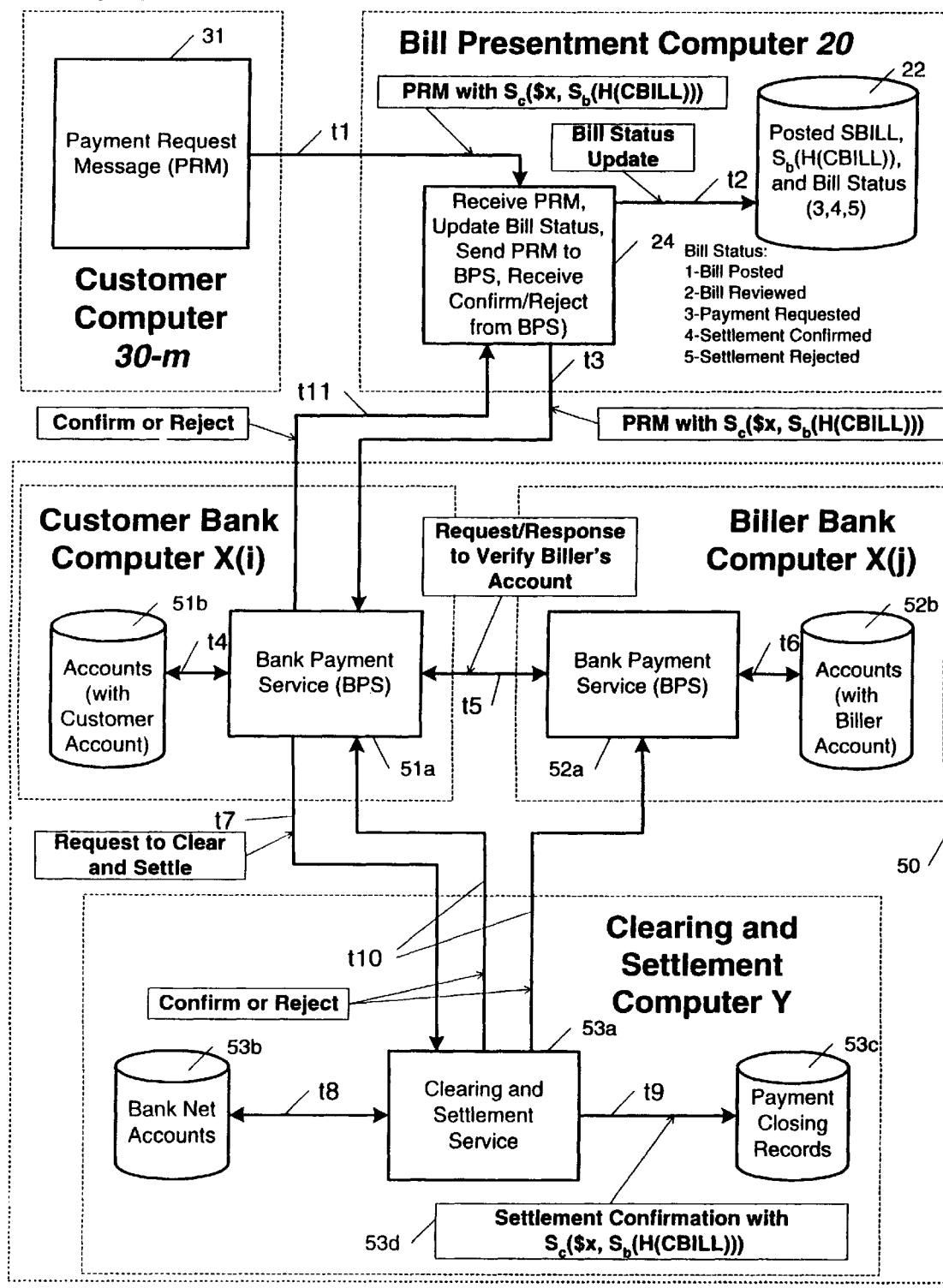
FIG. 5 shows how the bill presentment and payment system of FIG. 1 interacts with a payment subsystem 50.

Referring next to FIG. 5, it shows how the payment request message PRM is processed by the bill presentment computer 20 in conjunction with an electronic payment subsystem 50. In this payment subsystem 50, each customer has an account which is maintained by a computer X(i) in the customer's bank, and each biller has an account which is maintained by a computer X(j) in the biller's bank. All of computers X(i) and X(j) are coupled to each other and to another computer Y which resides in a clearing and settlement bank.

When the payment request message PRM is sent from the customer computer 30-$m$, that message is received by a program 24 in the bill presentment computer 20. This occurs in FIG. 5 at time t1. Then, in response to the received payment request message, the program 24 accesses the data base 22 and changes the status of the bill that is to be paid to a code of "3", which indicates that payment has been requested. This occurs at time t2 in FIG. 5.

Next, the program 24 in the bill presentment computer 20 sends the payment request message to the bank computer X(i) which maintains the account of the customer who authorized payment. There, the payment request message is received by a program 51$a$. This occurs at time t3 in FIG. 5. In response, the program 51$a$ accesses a data base 51$b$ in the customer computer X(i) which contains the account of the customer who authorized payment. By this step, the program 51a verifies that a sufficient amount of funds are in the customer's account to cover the authorized payment. This step occurs at time t4 in FIG. 5.

If sufficient funds are found, the computer X(i) sends a message to the computer X(j) in the bank for the biller who is to be paid. This message, which occurs at time t5 in FIG. 5, requests a verification of the account for the biller. In response, a program 52a in the computer X(j) accesses a data base 52b which contains the account of the particular biller who is to be paid. This occurs at time t6 in FIG. 5. Then the program 52a in the computer X(j) sends a return message back to the program 51a in computer X(i) which indicates whether or not the biller's account was found and is in order.

If the biller's account is in order, the computer X(i) sends a message to the clearing and settlement computer Y which requests that the transfer of funds which is authorized in the payment request message actually occur. This request, which is sent at time t7 in FIG. 5, is received by a program 53a in the computer Y. In response, the program 53a accesses a data base 53b which holds net accounts for the banks with computers X(i) and X(j). If those accounts are in order, then program 53a subtracts the amount which is to be paid from the net account for the bank with computer X(i), and adds the amount to be paid to the net account for the bank with computer X(j). This occurs at time t8 in FIG. 5.

After the net accounts are changed as described above, then at time t9, program 53a accesses a data base 53c in which a closing record for the payment request messages is stored. This closing record includes a) the hash of the selected complete bill which was digitally signed by the biller computer 10-n, and b) the authorization to pay the specified amount of funds $X on the selected complete bill; both of which are digitally signed by the customer computer 30-m. This is indicated in FIG. 5 by reference numeral 53d.

Thereafter, the computer Y sends a message to the computer X(i) and X(j) which indicates whether or not settlement was successful. This occurs at time t10 in FIG. 5. If settlement occurred, program 52a in computer X(j) increases the biller's account by the amount of the payment which was authorized, and program 51a in computer X(i) decreases the customer's account by the amount of the payment which was authorized.

Thereafter, computer X(i) sends a message to the bill presentment computer 20 which indicates whether or not the payment as authorized in the payment request message was settled. In response, program 24 in the bill presentment computer 20 changes the status code for the bill on which payment was requested to a code of "4" or "5". A code of "4" indicates that settlement occurred; and a code of "5" indicates that settlement was rejected.

Figure 6:
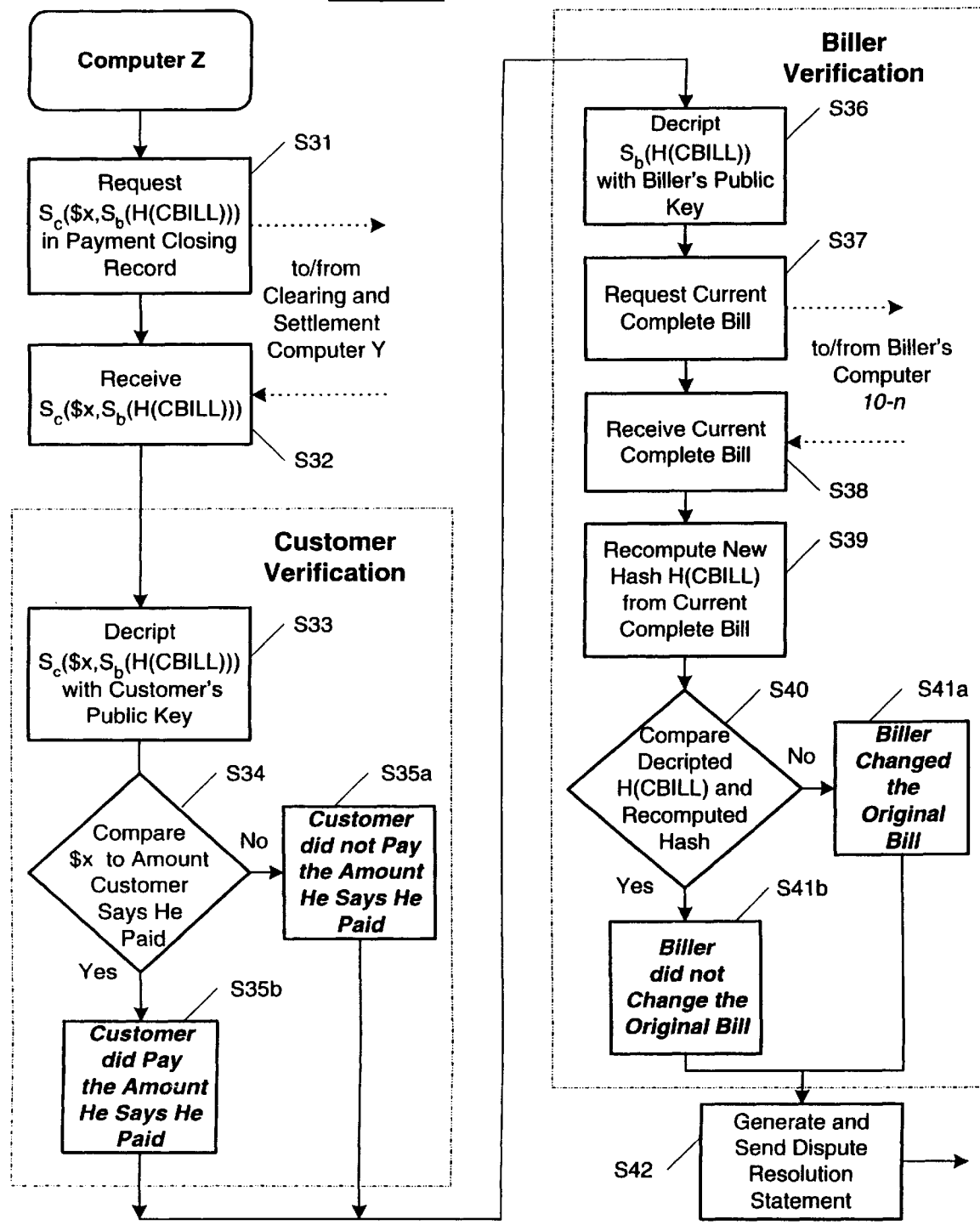
FIG. 6 shows how a payment closing record in the payment subsystem 50 of FIG. 5 is used by a computer Z, to help resolve disputes regarding the payment of a bill.

One primary feature of the above described electronic bill processing system is that item 53d in the payment closing records 53c of the clearing and settlement computer Y provides a means for resolving disputes which can arise between a customer and a biller. In FIG. 6, a process is shown which illustrates how such disputes are resolved. All of the steps of FIG. 6 are performed by a computer Z, which is a computer that has authorization to access item 53d for the disputed bill from the payment closing records 53c of the clearing and settlement computer Y, and has authorization to access the disputed bill from the biller computer 10-n.

Initially, in step S31 of FIG. 6, computer Z sends a message to the clearing and settlement computer Y which requests item 53d from the payment closing records 53c. In response, in step S32, computer Z receives item 53d which in FIG. 6 is indicated as $S_c(\$X, S_b(H(CBILL)))$. As was previously explained, $S_b(H(CBILL))$ is a hash of a complete bill which is digitally signed by the biller computer 10-n, and $X is the amount of funds which was authorized to be paid on that complete bill. $S_c$ indicates that both of the above items are digitally signed by the customer computer 30-m.

Next, in step S33, computer Z uses a public key for the customer computer 30-m to decrypt $S_c(\$X,S_b(HCBILL)))$. By this step, the quantities $X and $S_b(H(CBILL))$ are obtained in an unsigned form. Then in step S34, computer Z compares the quantity $X to an amount which the customer alleges that he paid. If those two quantities are not equal, then step S35a is performed wherein computer Z generates a message for a dispute resolution statement (DRS) which indicates that the customer did not pay the amount which he says he paid. Otherwise in step S35b, computer Z generates a message for the DRS which indicates that the customer did pay the amount which he says he paid.

Next, computer Z proceeds with step S36 in which a public key for the biller computer 10-n is obtained. Then, that public key is used by computer Z to decrypt $S_b(H(CBILL))$ and thereby obtain H(CBILL) in an unsigned form. Next, in step S37, computer Z sends a message to the biller computer 10-n which requests the current complete bill, which should correspond to the complete bill that was used to generate the above decrypted hash. This current complete bill is received by computer Z in step S38; and using that current complete bill, computer Z in step S39 recomputes a new hash.

Then, in step S40, computer Z compares the hash H(CBILL) as obtained in step S36 to the new recomputed hash as obtained in step S39. If those two hashes are not equal, then computer Z performs S41a in which a message is generated for the DRS which indicates that the disputed bill was changed after the amount $X was paid on the bill. Otherwise, step S41b is performed where computer Z generates a message for the DRS which indicates that the bill has not changed since the payment of $X was made.

Finally, in step S42, computer Z generates the DRS such that it includes the messages that were generated in steps S35a, S35b, S41a, and S41b. This DRS is sent to the customer and the biller to help them resolve their differences on their disputed bill.

Also, another primary feature of the above described electronic bill processing system is that it enables any change in any particular complete bill to be detected, even though each complete bill is only stored in a single computer, which is the biller computer 10-n. This feature is achieved by storing in the bill presentment computer 20 and the settlement computer Y, a hash of each complete bill, which is digitally signed by the biller computer. Each such digitally signed hash preferably consists of sixteen to thirty-two bytes; whereas each complete bill typically consists of thousands of bytes, as is seen from FIGS. 2A & 2B. Consequently, the total amount of storage is greatly reduced in the data base 22 of the bill presentment computer 20 and in the payment closing records 53c of the clearing and settlement computer Y.

An electronic bill processing system, which constitutes one preferred embodiment of the present invention, has now been described in detail in conjunction with FIGS. 1–6. In addition however, certain changes and modifications can be made to this preferred embodiment without departing from the nature and spirit of the invention.

For example, in FIG. 5, the customer computer 30-m sends the payment request message PRM to the bill presentment computer 20; and thereafter, computer 20 sends the payment request message to the electronic payment subsystem 50. This occurs at times t1 and t3 in FIG. 5. However, as a modification, the payment request message can be sent from the customer computer 30 directly to the electronic payment system 50; and this modification is shown in FIG. 7.

Figure 7:
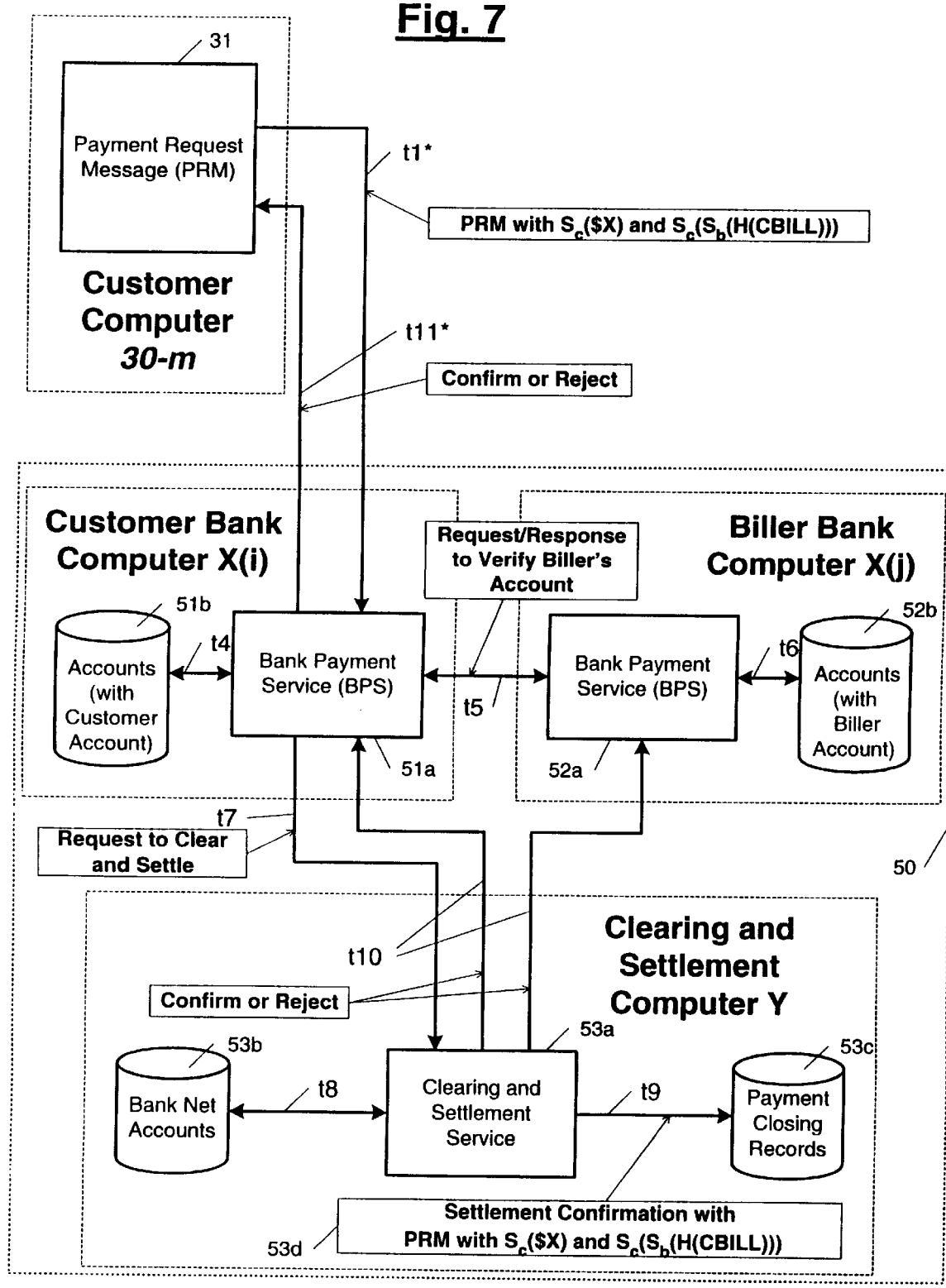
FIG. 7 shows two modifications to the bill presentment and payment system of FIGS. 1–6.

All of the components within the electronic payment subsystem 50 of FIG. 7 are the same as those which are shown in FIG. 5, and also their operation is the same as was previously described in conjunction with FIG. 5. Thus, all of the reference numerals within the electronic payment subsystem 50 of FIG. 7 are the same as those shown in FIG. 5.

At time t1* in FIG. 7, the customer computer 30-$m$ sends the payment request message directly to the electronic payment subsystem 50. No payment request message is sent to the bill presentment computer 20. Later, at time t11* in FIG. 7, the customer computer 30 receives a confirmation, or a rejection, for the payment request message from the electronic payment subsystem 50.

As another modification, the payment request message can be digitally signed by the customer computer 30-$m$ in a different manner from that which is shown in FIG. 5; and this modification is also illustrated in FIG. 7. With the modification of FIG. 7, the hash of the selected complete bill which is signed by the biller computer, and the authorization to pay a specified amount of funds on that selected complete bill, are each signed separately by the customer computer 30-$m$. These two separately signed items are shown in FIG. 7 as $S_c(\$X)$ and $S_c(S_b(H(CBILL)))$. By comparison, in FIG. 5, the items $X and $S_b(H(CBILL))$ are signed as one concatenated entity by the customer computer.

As another modification to the electronic bill processing system of FIGS. 1–6, the bill presentment computer 20 can be completely eliminated; and this modification is shown in FIG. 8. With the FIG. 8 modification, program 31 in the customer computer 30-$m$ sends a request to the biller computer 10-$n$ for a particular complete bill, which in FIG. 8 is indicated as request CBILL. In response, program 17 in the biller computer 10-$n$ calculates the hash of the complete bill and digitally signs that hash with the biller computer's private key "b". This digitally signed hash $S_b(H(CBILL))$ and the requested complete bill CBILL are then sent to the customer computer 30-$m$.

Thereafter, program 31 in the customer computer 30-$m$ performs the previously described steps S20–S24 of FIG. 4, whereby the complete bill is visually displayed, and a payment on the displayed bill can be authorized. If such a payment is authorized, then program 31 sends a payment request message PRM at time t1* to the electronic payment subsystem 50; and a response from the payment subsystem 50 is received at time t11*. To generate this response, all of the components within the electronic payment subsystem 50 of FIG. 8 operate the same as was previously described in conjunction with FIG. 7.

As another modification, each biller computer 10-$n$ can periodically interact with the electronic payment subsystem 50 to automatically identify all of the bills which have not been fully paid. This modification is shown in FIG. 8, wherein a program 18 is provided in the biller computer 10-$n$ which performs the above task.

In operation, program 18 in the biller computer 10-$n$ sends a message to computer X(j) in the biller's bank for a list of all payments which have been received on the biller's account. Then, in response, program 52$a$ in computer X(j) generates the requested list from data base 52$b$, and sends the list to the biller computer 10-$n$.

Thereafter, program 18 in the biller computer 10-$n$ compares the list of payments that have been made (as indicated on the received list) with the list of payments that are due (as generated from the biller's CBILL data base 13). For each bill which is not fully paid, program 18 sends a request, to computer Z of FIG. 6, for a corresponding dispute resolution statement DRS. These statements are then used to help determine if the unpaid bill is the fault of the customer, or the biller, or both; as indicated by steps S35$a$, S35$b$, S41$a$, and S41$b$ of FIG. 6.

When a dispute resolution statement indicates that a customer did not pay the amount which he says he paid on a particular bill, then program 18 in the biller computer 10-$n$ can electronically send a notice to the customer computer 30-$m$; and this notice can explain that the dispute resolution statement shows that the customer is at fault. Conversely, when a particular dispute resolution statement indicates that a bill which was originally sent to a customer somehow got changed, then the biller computer 10-$n$ can electronically send a message to the customer acknowledging that the biller error has been caught. Such a message can be sent directly to the customer computer 30-$m$, or can be sent to the bill presentment computer 20 for presentment to the customer computer.

As another modification, all of the messages that are sent between the various computers 10-$n$, 20, 30-$m$, X(i), X(j), Y, and Z, can include additional information, as desired, over that which has been described in conjunction with FIGS. 1–8. For example, those messages can include a payment due date, a billing period, a bill reference number, an account number, etc. An example of such additional information is illustrated at the top of the bill summary which is shown in FIG. 3.

Similarly, all of the messages which are sent between the computers 10-$n$, 20, 30-$m$, X(i), X(j), Y, and Z, can be sent on communication channels of any type. For example, the messages can be sent on communication channels which reside in physical cables or which reside in wireless networks. Also, each message between the computers can use any form of encryption to ensure that the message is received only by the one computer to which the message was sent. Similarly, any one way hash functions (message digest, cryptographic text sum, message integrity check, etc.) can be used to generate the hashes of FIGS. 1–8, and any processes can be used to generate the digital signatures of FIGS. 1–8.

As another modification, the customer computer 30-$m$ can be selected from a wide variety of electronic input/output devices. One such device is a standard personal computer; but as an alternative, the customer computer 30-$m$ can also be a public kiosk or a laptop computer or any other handheld communications device which is able to send and receive the messages which have been described in conjunction with FIGS. 1–8.

Accordingly, it is to be understood that the present invention is not limited to the details of any one particular illustrated embodiment or modification, but is defined by the appended claims.

What is claimed is:

1. An electronic bill processing system for efficiently presenting and verifying bills, which is comprised of:
multiple biller computers, each biller computer having a data base which stores a respective plurality of complete bills for a plurality of customers;
a bill presentment computer, coupled to and distinct from all of said biller computers, having a data base which stores a summary of each complete bill in which superfluous data is extracted and a respective hash of each complete bill which is digitally signed by the corresponding biller computer, where each summary and hash are at least twenty times smaller than the corresponding complete bill; and, multiple customer computers, coupled to said biller computers and said bill presentment computer, wherein each particular customer computer includes a control means which requests and receives from said bill presentment computer, a summary of a selected complete bill plus its respective digitally signed hash, and as an option, requests and receives from said biller computer, said selected complete bill.

2. A system according to claim 1 wherein said particular customer computer responds to the receipt of said selected complete bill by—a) generating a new hash of said selected complete bill, b) decrypting said digitally signed hash of said selected complete bill, and c) indicating that a discrepancy exists, if the decrypted digitally signed hash does not equal said new generated hash.

3. A system according to claim 1 wherein said particular customer computer also sends a payment message, to said bill presentment computer, which contains—a) said digitally signed hash of said selected complete bill, and b) an authorization to pay a specified amount of funds on said selected complete bill, both of which are digitally signed by said particular customer computer.

4. A system according to claim 3 where within said payment message, said digitally signed hash of said selected complete bill and said authorization to pay said specified amount of funds are signed as one combined entity by said particular customer computer.

5. A system according to claim 3 where within said payment message, said digitally signed hash of said selected complete bill and said authorization to pay said specified amount of funds are each signed separately by said particular customer computer.

6. A system according to claim 3 wherein said bill presentment computer responds to said payment message by storing, in its data base, said digitally signed hash of said selected complete bill and said authorization to pay a specified amount of funds on said selected complete bill, both of which are digitally signed by said particular customer computer, as obtained from said payment message.

7. A system according to claim 3 which further includes an electronic payment subsystem that holds respective accounts that are correlated with said biller and customer computers and wherein said bill presentment computer responds to said payment message by sending a request to said payment subsystem to transfer said specified amount of funds from the account for said particular customer computer to the account for said biller account.

8. A system according to claim 7 wherein said payment subsystem stores a closing record which contains said digitally signed hash of said selected complete bill and said authorization to pay a specified amount of funds on said selected complete bill, both of which are digitally signed by said particular customer computer, as obtained from said payment message.

9. A system according to claim 7 wherein said bill presentment computer also—a) receives a response from said payment subsystem which indicates that the requested transfer has occurred or was rejected, and b) updates its data base to reflect said response.

10. A system according to claim 9 wherein said bill presentment computer also generates and sends messages to said biller computer which indicate whether or not payment of a bill has been authorized, and whether the specified amount of funds have been transferred or were rejected in said payment subsystem.

11. A system according to claim 9 wherein said bill presentment computer also generates and sends messages to each customer computer which indicate whether or not an authorized transfer of funds has occurred or has been rejected in said payment subsystem.

12. A system according to claim 1 which further includes an electronic payment subsystem that holds respective accounts that are correlated with said biller and customer computers, and wherein said particular customer computer also sends a payment message, to said payment subsystem, which contains—a) said digitally signed hash of said selected complete bill, and b) an authorization to pay a specified amount of funds on said selected complete bill, both of which are digitally signed by said particular customer computer.

13. A system according to claim 12 where within said payment message, said digitally signed hash of said selected complete bill and said authorization to pay said specified amount of funds are signed as one combined entity by said particular customer computer.

14. A system according to claim 12 where within said payment message, said digitally signed hash of said selected complete bill and said authorization to pay said specified amount of funds are each signed separately by said particular customer computer.

15. A system according to claim 12 wherein said payment subsystem stores a closing record which contains said digitally signed hash of said selected complete bill and said authorization to pay a specified amount of funds on said selected complete bill, both of which are digitally signed by said particular customer computer, as obtained in said payment message.

* * * * *